United States Patent [19]
Myers

[11] 4,118,020
[45] Oct. 3, 1978

[54] SPRING ASSEMBLY AND METHOD OF ASSEMBLY THEREOF

[75] Inventor: Allen D. Myers, Decatur, Ill.

[73] Assignee: Caterpillar Tractor Co., Peoria, Ill.

[21] Appl. No.: 823,302

[22] Filed: Aug. 10, 1977

[51] Int. Cl.$^2$ ............................ F16F 1/10; F16F 3/04
[52] U.S. Cl. ................................. 267/168; 213/42; 267/61 R; 267/177
[58] Field of Search ............... 267/162, 166, 167, 168, 267/169, 177, 174, 175, 176, 61 R, 61 S, 60, 62, 60 A, 4, 170, 89, 20 R, 20 A, 20 C; 92/130 A; 213/42

[56] References Cited

U.S. PATENT DOCUMENTS

| 583,785 | 6/1897 | Brown | 267/61 R |
|---|---|---|---|
| 1,125,220 | 1/1915 | Vantrease | 267/60 |
| 1,317,788 | 10/1919 | Hinsdale | 267/171 |
| 1,931,183 | 10/1933 | Drenning | 267/4 |
| 2,328,619 | 9/1943 | Cox | 188/170 |
| 3,302,536 | 2/1967 | Fites | 92/130 A |
| 3,448,764 | 6/1969 | Dykzeul et al. | 137/505.41 |
| 3,762,442 | 10/1973 | Paul | 137/625.2 |
| 3,944,196 | 3/1976 | Schwartzkopf | 267/4 |

FOREIGN PATENT DOCUMENTS 657,318  9/1951  United Kingdom ............... 267/168

*Primary Examiner*—George E. A. Halvosa
*Attorney, Agent, or Firm*—Wegner, Stellman, McCord, Wiles & Wood

[57] ABSTRACT

A spring assembly and a method of assembly therefor are provided wherein one or more longitudinal coil springs are retained between two end caps. Each end cap receives a hollow pin, each pin extending axially inwardly therefrom and abutting the other pin. The pins include axially aligned threaded throughbores which receive a threaded stud whereby the pins are maintained in abutting relation. The spring assembly is assembled by means of assembly tools which serve to rotate the pins to allow the stud to be received therein and to space the stud within the pins.

8 Claims, 2 Drawing Figures

SPRING ASSEMBLY AND METHOD OF ASSEMBLY THEREOF

BACKGROUND OF THE INVENTION

Spring mechanisms for providing predetermined compression values in track-type tractors, vehicle disc brakes, railway trucks and the like are well known. Such mechanisms must provide sufficient resistance to compression for their intended purposes yet must be sufficiently resilient to recoil under heavy shock loads without failure. It is desirable that such spring mechanisms be capable of field assembly and removal.

Typical spring assemblies include one or more (usually two) concentric coil springs retained between two abutment collars or end caps. The collars or caps are connected by a bolt or similar retention device. In certain applications, one of the end caps may be fixed and the other movable to allow spring compression. Often, both end caps are movable.

The amount of compression of the springs and, therefore, the force required to further compress the mechanism may be predetermined by selecting a retention bolt of appropriate length. Such bolts are usually of unitary construction, and are secured to the retaining caps by any of a variety of means, including receipt in a threaded bore in the cap, or by retention against the cap by a flange or head on the bolt. Such a flange may be provided by a nut receiving an end of the bolt.

Spring assemblies of the prior art have several disadvantages, including a tendency to fly apart when being handled, disassembled, assembled, or removed from a mechanism. For example, a retaining nut might be loosened from a bolt, thereby allowing the spring to drive the retaining caps apart. Such disassembly, whether intentional or inadvertent, is to be avoided due to the resultant rapid release of spring forces.

Further, previous spring assemblies are not susceptible to easy assembly, due to the great forces and precision required in determining the compressed length of the springs.

SUMMARY OF THE INVENTION

The present invention is directed to overcoming one or more of the problems as set forth above.

According to the present invention, an improved spring assembly is provided wherein at least one helical spring is retained between two end caps, each of the caps being retained by a pin having a threaded axial bore with a threaded stud received by the bores to maintain the pins in abutting relation.

Further, a method for assembling a spring assembly is provided whereby each of two pins with a threaded bore is disposed in an end cap, with a tool and a stud threadably received in one pin whereby the pins each extend axially toward each other inwardly from the end caps such that the stud is received by the other pin to draw the pins into abutting relation upon relative rotation of the pins.

Other features and advantages of the present invention will be apparent to those skilled in the art from the following detailed description and accompanying drawings.

DESCRIPTION OF THE PREFERRED EMBODIMENT

Figure 1:
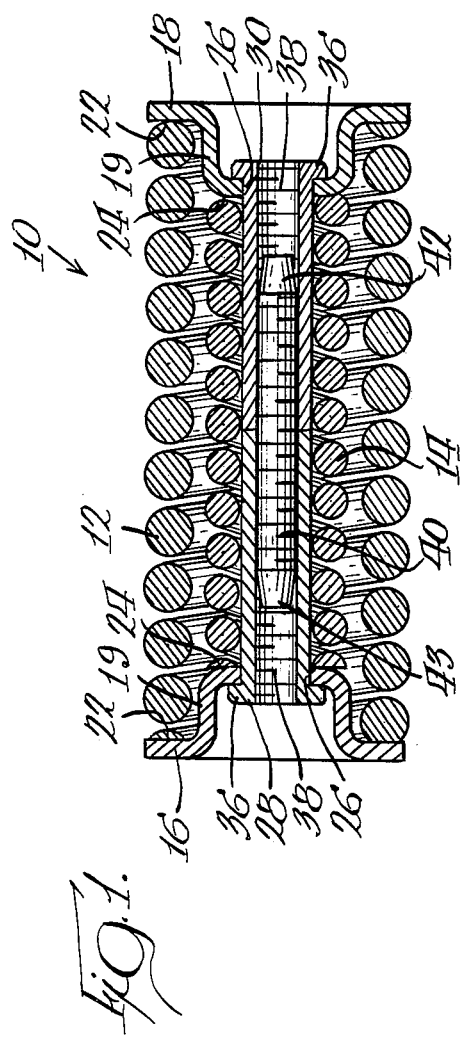
FIG. 1 is a sectional view of a spring assembly.

Referring to FIG. 1, a recoil spring assembly 10 includes a pair of concentric, elongate coil springs 12 and 14 which differ in compressive force and diameter. It will be understood that, while two springs are typically and preferably employed in this invention, only one is necessary.

The springs 12 and 14 engage and are retained between two preferably identical cup-shaped end caps 16 and 18. As illustrated, each cap 16 and 18 is stepped and has a cylindrical axial wall 19 extending between a radially outwardly directed peripheral flange 22 and an end wall 24. The spring 12 abuts the flanges 22 and the spring 14 abuts the end walls 24. The end caps 16 and 18 need not be stepped but may be flat or of another configuration.

Each end cap 16 and 18 includes a central aperture 26 through which extends a hollow pin 28 or 30, and are slidable on their respective pins. The apertures 26 may be circular or of another convenient configuration, as long as the shape of the apertures 26 corresponds to that of the pins 28 and 30. The pins 28 and 30 are preferably identical and each has a radially outwardly extending lip 36, and a threaded axial throughbore 38.

Threadably received within the throughbore 38 of each pin 28 and 30 is a threaded stud 40 which maintains the pins 28 and 30 in abutting relation. The stud 40 is threaded for substantially its entire length and is chamfered at either or both of its ends 42 and 43. It will be noted that the axial centerlines of the stud 40, the pins 28 and 30, the end caps 16 and 18 and the springs 12 and 14 coincide.

The spring assembly 10 of FIG. 1 is characterized by a compressive strength determined by the spring constants of springs 12 and 14 and by the total assembled length of the pins 28 and 30. It will be appreciated that a choice of short pins 28 and 30 will result in a relatively short assembled length of the spring assembly and therefore a greater compressive force. Conversely, long pins 28 and 30 will result in a relatively unstressed spring assembly which requires a lower force to effect compression thereof due to the resulting relatively long assembly length.

Figure 2:
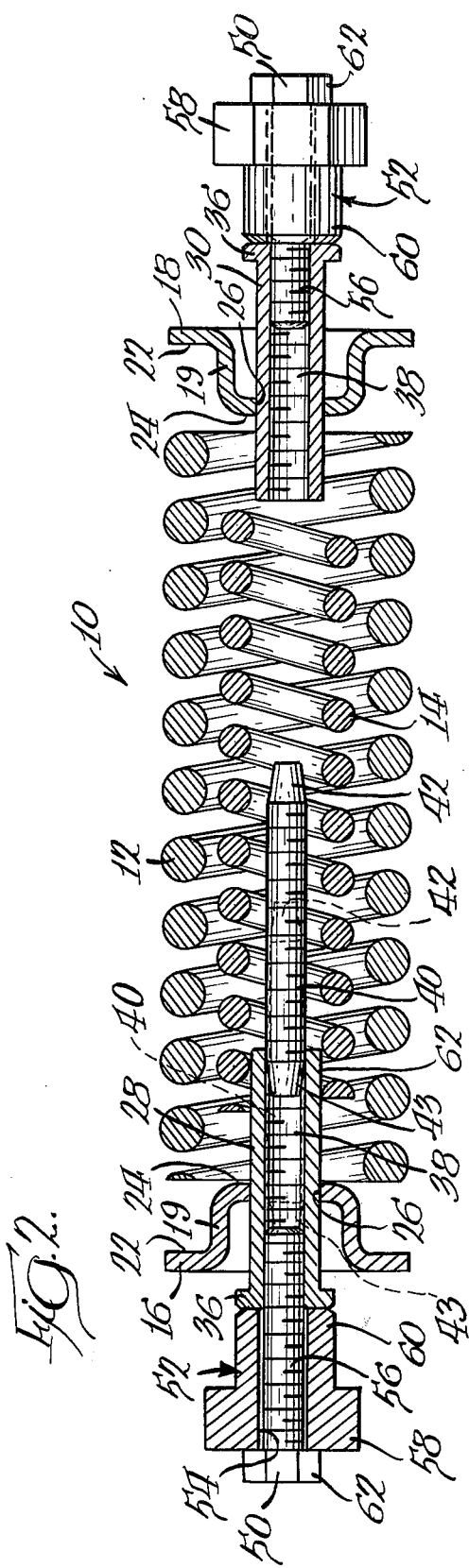
FIG. 2 is an exploded sectional view of the spring assembly of FIG. 1 with assembly tools positioned for assembling the spring assembly.

FIG. 2 represents the unassembled components of the spring assembly 10 of FIG. 1 and schematically illustrates the relation of those components just prior to assembly. Before assembly, the springs 12 and 14 are uncompressed and are shown in FIG. 2 in an unstressed condition. Preferably, the sum of the axial lengths of the throughbores 38 of the pins 28 and 30 is greater than the axial length of the stud 40 so that both ends 42 and 43 of the latter can be recessed within the throughbores 38 when assembled according to the assembly method to be described. This feature of the invention virtually positively assures that the stud cannot be rotated to allow disassembly.

Moreover, it is preferred that the pins 28 and 30 and the stud 40 each have sufficient length so that the stud 40 may be at least initially threaded into each of the throughbores 38 of the pins before the flanges 22 or end walls 24 compressively engage the springs 12 and 14 to allow the assembly method to be described hereinafter to be easily initiated. In general, this relation can be met by forming the pins and the stud to have lengths which, when summed, exceed the uncompressed length of the shorter of the springs.

In assembling the spring assembly, two tools in the form of two bolts 50 are utilized in connection with respective collars 52. Each of the collars 52 has a throughbore 54 of sufficiently large diameter that the shank 56 of the associated bolts 50 may pass freely therethrough. Each collar 52 further includes a hexhead formation 58 by which the collar 52 may be gripped and a reduced diameter projection 60 of a size approximately corresponding to that of the lip 36 of the corresponding pin 28 and 30 and yet of lesser diameter than the axial wall 19 of the corresponding cap 16 or 18. It will also be observed that the axial length of each reduced diameter projection 60 is such that it may fully enter the corresponding cap 16 or 18 without the hexhead 58 encountering the cap flange 22.

Of significance is the fact that the head 62 of each bolt 50 is of lesser size than the reduced diameter projection 60 of the corresponding collar 52.

The stud 40 is at least partially threaded into one of the pins (shown in FIG. 2 as the pin 28), and the pins 28 and 30 are inserted into corresponding ones of the caps 16 and 18. The stud 40 may optionally be fully threaded into a pin, such as the pin 28, until the stud 40 abuts the bolt shank 56. The springs 12 and 14 are sandwiched between the caps and about the stud 40. The pins 28 and 30 are brought together such that the stud 40 enters the other pin 30 and is captured therein by effecting relative rotation between the pins 28 and 30 which also serves to compress the springs.

Relative rotation between the pins 28 and 30 is effected by relatively rotating the tools 50 after they have been inserted through the throughbores 54 of their associated collars 52 and into the throughbore 38 of the associated pin 28 and 30. If the stud 40 has been fully threaded into one pin 28 or 30, relative rotation between the tools 50 may be effected by rotation of one tool 50 while the other tool 50 is held stationary or, alternately, by rotation of both tools 50. Relative rotation is continued until the facing ends of the pins 28 and 30 abut each other, as illustrated in FIG. 1. The tools 50 are then removed. This is accomplished by preventing relative rotation between the collars 52. A gripping force to prevent relative rotation is applied to the hexheads 58 of each collar 52. Thereafter, the tools 50 may be removed by effecting reverse relative rotation between the two. This will not result in disassembly of the spring assembly since the large area of frictional engagement between the collars 52 and the lips 36 on the pins 28 and 30 effectively locks the pins to the associated collar against rotation. Because of the lesser area of frictional engagement between the heads of the tools 50 and the collar 52 upon relative reverse rotation of the tools 50, they will disengage from the collars rather than effect relative rotation in the reverse direction of the pins 28 and 30.

From the foregoing, it will be appreciated that a spring assembly made according to the invention cannot be disassembled either inadvertently or intentionally since the tools utilized during assembly, namely, the tools 50, when driven in a direction that would tend to cause separation of the pins 28 and 30, merely thread their way out of the associated throughbores 38 without causing any rotation of the corresponding pins 28 and 30 that would tend to cause disassembly. The fact that the lips 36 of the pins are recessed within the end caps 16 and 18 renders it almost impossible for the lips 36 to be grasped, as by pliers or the like, with sufficient gripping force so as to allow disassembly.

It wll further be appreciated that the method of assembling the spring assembly is simple and economical, requiring only one pair of tools which may be identical. Various compressive strengths in the assembly are easily obtainable simply by suitably selecting the overall length of the pins. Lastly, when the pins 28 and 30 and the end caps 16 and 18 are identical, the number of differing components required to form a spring assembly according to the invention is minimized, thereby minimizing manufacturing and inventory costs.

The embodiments of the invention in which an exclusive property or privilege are defined as follows:

1. A spring assembly, comprising:
   at least one helical spring;
   two spaced retention caps, said spring engaging and extending longitudinally between said caps coaxially therewith;
   two pins, each said pin retaining a respective cap and extending axially therefrom toward the other said cap into abutment with the other said pin, at least one said cap being reciprocably retained by one said pin, each said pin having a threaded axial bore, said bores being in axial alignment; and
   a threaded stud received by the bore of each said pin and retaining said pins in abutting relation;
   said pins, caps and stud being constructed and arranged with respect to each other so as to be effectively inaccessible to a tool or the like for application of a rotative force tending to disassemble said assembly.

2. The spring assembly of claim 1 wherein each of said caps is reciprocably retained by a respective one of said pins.

3. The spring assembly of claim 2 wherein said pins and said caps are identical.

4. A spring assembly, comprising:
   a helical spring; first and second spaced retention caps, one at each end of the spring; first and second threaded pins having enlarged heads mounting and retaining said caps with at least one cap being reciprocably mounted on its associated pin; and a threaded member having a length greater than that of the threaded portion of one of the pins and engaged with both pins to hold the spring assembly in assembled relationship with said spring in compression; the sum of the lengths of the first and second pins and the threaded member being greater than that of the helical spring when uncompressed, said pins, caps and stud being constructed and arranged with respect to each other so as to be effectively inaccessible to a tool or the like for application of a rotative force tending to disassemble said assembly.

5. A spring assembly, comprising:
   two helical springs;
   two spaced cup-shaped retention caps, each said retention cap comprising an annular first abutment surface having a central aperture and a peripheral axial wall extending from said first abutment surface and terminating in an outwardly projecting radial lip forming a second abutment surface, said first surfaces being closer to each other than said second surfaces, each said spring extending longitudinally between said caps coaxially therewith, one of said springs engaging said first abutment surface of each said cap and the other of said springs engaging said second abutment surface of each said cap;

two pins, each said pin reciprocably received in the central aperture of a respective one of said caps and retaining said respective one of said caps and extending axially therefrom toward the other said cap into abutment with the other said pin, each said pin having a threaded axial throughbore, said throughbores being in axial alignment; and a threaded stud received by the throughbore of each said pin and retaining said pins in abutting relation;

said pins, caps and stud being constructed and arranged with respect to each other so as to be effectively inaccessible to a tool or the like for application of a rotative force tending to disassemble said assembly.

6. The spring assembly of claim 5 wherein said caps are retained by said pins by a radially outwardly extending flange on each said pin.

7. The spring assembly of claim 6 wherein the sum of the axial lengths of said throughbores is greater than the axial length of said stud and the ends of said stud are recessed in respective ones of said throughbores.

8. A spring assembly, comprising:

two helical springs;

two spaced cup-shaped retention caps, each said retention cap comprising an annular first abutment surface having a central aperture and a peripheral axial wall extending from said first abutment surface and terminating in an outwardly projecting radial lip forming a second abutment surface, said first surfaces being closer to each other than said second surfaces, each said spring extending longitudinally between said caps coaxially therewith, one of said springs engaging each said first abutment surface and the other of said springs engaging each said second abutment surface;

two pins, at least one said pin reciprocably received in a central aperture of a respective one of said caps and retaining said respective one of said caps and extending axially therefrom toward the other said cap in abutment with the other said pin, each said pin having a threaded axial throughbore, said throughbores being in axial alignment; and a threaded stud received by the throughbore of each said pin and retaining said pins in abutting relation;

said pins, caps and stud being constructed and arranged with respect to each other so as to be effectively inaccessible to a tool or the like for application of a rotative force tending to disassemble said assembly.

* * * * *